United States Patent Office.

GEORGE W. SCOLLAY, OF NEW YORK, N. Y.

PROCESS OF MAKING PAINT FROM OIL FOOTS.

SPECIFICATION forming part of Letters Patent No. 396,432, dated January 22, 1889.

Application filed March 21, 1888. Serial No. 268,007. (Specimens.)

*To all whom it may concern:*

Be it known that I, GEORGE W. SCOLLAY, a citizen of the United States, residing in the city, county, and State of New York, have invented certain new and useful Improvements in the Process of Making Paint of the Residuum Resulting from the Refinement of Vegetable Oils, of which the following is a specification in such full, clear, concise, and exact terms as will enable any one skilled in the art to which my invention appertains to make and use the same.

I have heretofore described in Letters Patent Nos. 377,406, 378,113, and 378,114, granted to me, various processes by means of which cotton-seed and other vegetable oils may be refined and the residuum or "foots" resulting therefrom made into paint or paint-stock.

My present invention relates to the same general subject-matter; and it consists of a novel process of making paint of the residuum resulting from the refinement of cotton-seed and analogous oils.

In the practice of my present invention I take a given quantity of cotton-seed or other analogous oils—say a barrel, or three hundred and seventy-five pounds—at a temperature when the oil is sufficiently limpid to be readily worked, preferably at about 80° to 100° Fahrenheit, and to this I add from two and a half to four pounds of caustic soda or other suitable alkali, the same being in solution varying in strength according to the quality and character of the oil to be treated.
The combined oil and alkali is then agitated— say from fifteen to forty minutes—when it is left to settle at about the same temperature, which operation usually requires from eight to eighteen hours. The refined oil is then drawn off down to the residuum or foots. This residuum may then either be directly removed from the tank and further settled or it may be left in the tank to still further settle and until it is sufficiently separated from the refined oil. These steps of my process are old in the art of refining oil. They result in the production of a refined oil and a residuum, (foots,) which is in the form of soluble soap or soap-stock. Now, to make paint of this residuum, I treat it with a metallic chloride, such as chloride of calcium or other equivalent substance, slightly in excess of the alkali previously employed, thereby converting the soluble soap into an insoluble plaster or paint-stock, out of which the soluble chlorides formed or used in excess may be washed or pressed. The paint-stock or insoluble plaster is now in a suitable condition to be ground and mixed with linseed-oil and with pigments commonly used in paints.

The residuum when it is separated from the oil, as above described, is of a dark or black color. Now, before subjecting the same to the treatment of metallic chlorides, as described, I prefer to let this residuum stand in a suitable receptacle until it assumes, when not in contact with the air, a lighter or yellow color. Then it is treated with the chlorides, as set forth, after which its yellowish color is maintained and is not changed by subsequent contact with air.

It will be observed that in the process here described the oil is not treated with the metallic chlorides, the chlorides in this case being mixed with the residuum after it is separated from the refined oil.

I am aware that cotton-seed oil has heretofore been treated with alkali in solution for the purpose of refining it, and the residuum in the form of soap-stock separated from the oil; but in no such case, as far as I am aware, has the said residuum after being separated from the oil been treated with metallic chlorides or equivalent substances by means of which the same may be formed into an insoluble plaster or paint-stock.

Having thus described my invention, I claim—

1. The process, substantially as herein described, of making paint of the residuum resulting from the refinement of vegetable oils, which consists of mixing vegetable oil with alkali in solution, for the purpose of precipitating the residuum and refining the oil, then separating the refined oil from the residuum, and then mixing said residuum with a metallic chloride or its equivalent, for the purpose of converting it into paint.

2. The process, substantially as herein described, of making paint of the residuum resulting from the refinement of vegetable oils, which consists of mixing vegetable oil with alkali in solution, for the purpose of precipitating the residuum and refining the oil, then separating the refined oil from the residuum, then excluding the air from said residuum until it assumes a lighter or yellow color, and then mixing said residuum with a metallic chloride or its equivalent, for the purpose of converting it into paint.

GEO. W. SCOLLAY.

Witnesses:
AMOS BROADNAX,
J. EDGAR BULL.